July 3, 1951  W. CREVATIN ET AL  2,559,405
VALVE
Filed Dec. 14, 1948  2 Sheets-Sheet 1

INVENTORS.
Waldemar Crevatin, Gilio Crevatin,
Mário Crevatin

BY

ATTORNEY.

July 3, 1951

W. CREVATIN ET AL 2,559,405

VALVE

Filed Dec. 14, 1948

INVENTORS.
Waldemar Crevatin, Gilio Crevatin,
Mario Crevatin

BY

ATTORNEY.

Patented July 3, 1951

2,559,405

UNITED STATES PATENT OFFICE 2,559,405

VALVE

Waldemar Crevatin, Gilio Crevatin, and Mário Crevatin, Sao Paulo, Brazil

Application December 14, 1948, Serial No. 65,244
In Brazil March 31, 1948

1 Claim. (Cl. 251—141)

This invention relates to valves, and more particularly to manual, screw operated valves of the character where the valve disc seats mainly by action of the fluid pressure coming upon the disc.

Valves of this character are shown in patent to V. Crevatin et al., 2,389,297 of November 20, 1945; the valves there illustrated being of the faucet type.

The present invention has for its primary object, the provision of valves embodying means whereby maximum flow of fluid therethrough may be varied or metered according to the fluid pressure.

Another object is to provide means whereby this may be accomplished by selecting from a variety of metering rings having radial flow ports, the one most suited to permit the desired quantity of fluid flow during a given period of time and install it in the valve in a manner that it may not be readily removed.

A further object is to provide a metering ring in association with a bushing for detachably holding an annular valve seat in the fluid passage or flow opening of the valve.

A still further object is to provide valves embodying some of the features disclosed in the aforesaid Patent 2,389,297, in a valve of the globe or angle type having pipe ends so that they may be interposed in pipe lines in contradistinction to faucets, and to permit of adjustment as to the maximum distance the valve disc may be moved away from its seat.

Other objects and advantages will appear in the following detailed description of two typical embodiments of our present invention, taken in connection with the accompanying drawings, forming a part of this specification, and in which drawings.

Figure 1:
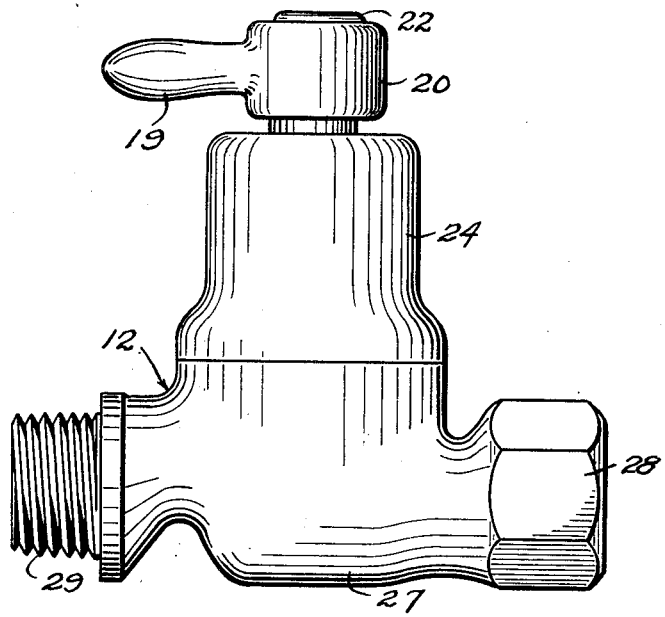
Fig. 1 is a side elevation of a valve similar to a globe valve constructed according to our invention.
Figure 2:
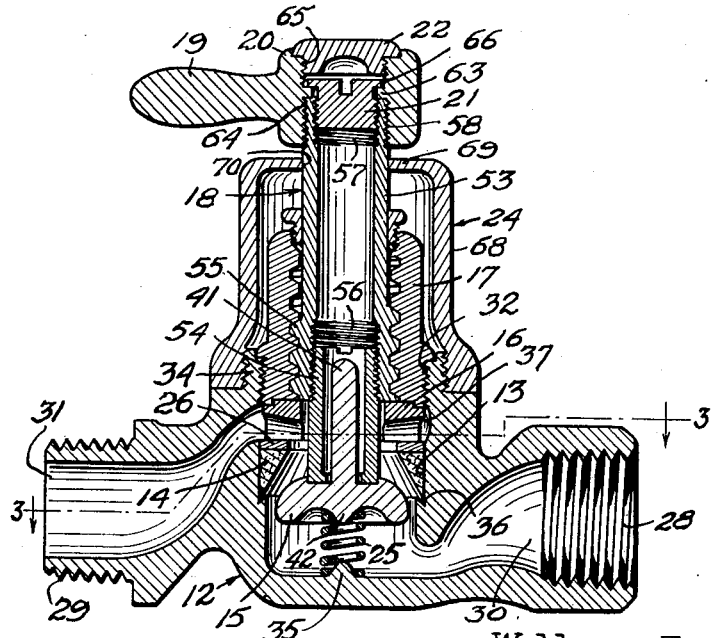
Fig. 2 is a central vertical sectional view of the same axially of the aligned pipe ends of the valve housing.

In the drawings and referring first to Figs. 1–9 inclusive the valve comprises a housing 12, provided with a fluid passage or flow opening 13 in which is disposed an annular seat 14 for a valve disc 15, held in place by a metering ring 16 which in turn is held in place by a bushing 17 through which a valve stem 18 extends, the stem being shown as provided with an operating handle 19, a hub 20 of which is partly held secure in an adjusted position on the stem 18 by plug 21 detachably carried by the upper end portion of the stem. In the examples shown in Figs. 1, 2 and 10, a suitable crowning button 22 is shown detachably carried by hub 20, and a bonnet 24 is detachably carried by the housing 12. We have also shown an expansion coil spring 25 to bias the valve disc 15 to a seating position with respect to seat 14 but this is unnecessary if the valve disc may become seated by gravity, as when the valve is in an inverted position with the handle 19 lowermost, or where the fluid pressure may act upon the valve disc and seat it in somewhat the same manner as the valve proper of a check valve is closed. When the valve seat 14 is made of soft material, such as rubber, a washer 26 may be interposed between same and the metering ring as shown in Fig. 2.

In Figs. 1 and 2 the housing 12 comprises a hollow body 27 provided with aligned pipe ends 28 and 29 having inlet and outlet ports 30 and 31. The hollow body 27 has an upper opening 32 coaxial with the fluid passage 13, the opening 32 being surrounded by an externally and internally screw threaded flange 34. The port 30 communicates with the end of the passage 13 and a spring retaining boss 35 may be provided integral with the body 27 for expansion spring 25.

The valve seat 14 may be accommodated in a substantially V-shaped groove 36 in the fluid passage or flow opening 13, similar to that shown in Patent 2,389,297 above referred to, so as to receive the valve seat 14 as hereafter described above the opening 13; the cavity of hollow body 27 is cored out to provide an arcuate fluid flow way 37 which communicates with outlet port 31.

Figure 7:
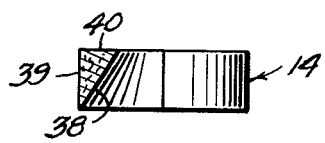
Fig. 7 is a similar view disclosing a suitable valve seat of the character shown in the aforesaid Patent 2,389,297.
Figure 9:
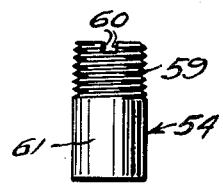
Fig. 9 is a view in elevation of a minor valve stem section.

In the example shown the annular valve seat 14, shown more in detail in Fig. 7 may be made of any suitable material such as set plastic composition containing fibers, and presents a truncated conical valve seat surface 38. The outer cylindrical surface 39 abuts the wall of flow opening 13 and extends into the groove 36 as shown in Fig. 2. A flat upper surface 40 may have surmounted thereon, the washer 26 although this may be dispensed with, if the valve seat is made of comparatively hard material, such as hard rubber or metal.

The valve disc 15 is similar to that shown in the Patent 2,389,297 in that it is provided with an axial stem 41 extending from one face, and a spring-retaining boss 42 extending from the other face for cooperation with the spring 25, when such is used as a part of the assembly.

Figure 4:
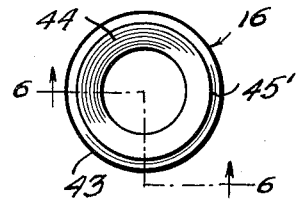
Figs. 4 and 5 are top and bottom plan views, respectively, of a metering ring made according to our invention.
Figure 5:
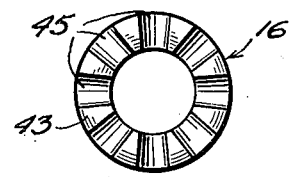
Figure 6:
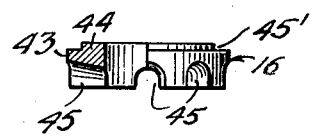
Fig. 6 is a view partly in elevation and partly in vertical section on the line 6—6 of Fig. 4.
Figure 3:
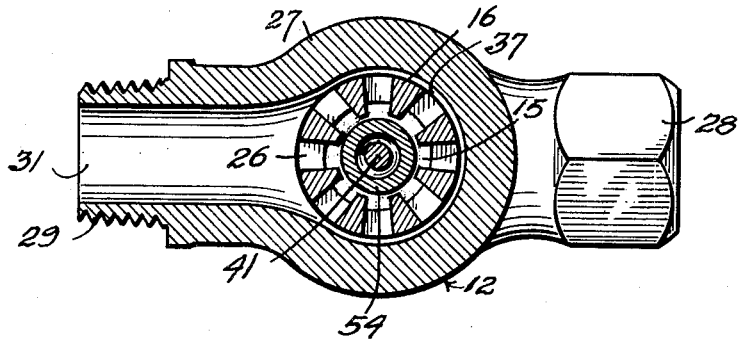
Fig. 3 is a horizontal sectional view on substantially the line 3—3 of Fig. 2.

As to the metering ring, shown more in detail in Figs. 4, 5 and 6, it preferably comprises a circular body part 43 formed with an inset flange 44 providing an annular recess 45'. The body part 43 has a plurality of flow ways or grooves 45, preferably radially disposed and open to the center, outer periphery and bottom of the body. These grooves may be conveniently milled in the body part and a great number of these metering rings may be provided, the depth of the grooves or size of the ways ranging in dimensions from very small to relatively large, so that a selection may be made as to the one to be used in the assembly, according to maximum flow desired when the valve disc is fully unseated. In practice the lower face of the metering ring bears upon the washer 26 or the valve seat 14 as the case may be.

Figure 8:
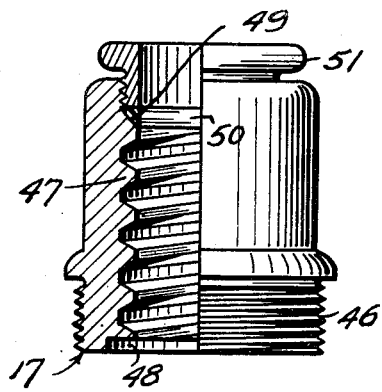
Fig. 8 is an enlarged view partly in vertical section and partly in elevation of a suitable bushing, packing and gland forming a part of the invention.

The bushing 17 shown in detail in Fig. 8 is provided with a lower screw threaded portion 46 for threaded engagement with the internal thread of flange 34, and a rather coarse internal thread 47 extending upwardly from an annular recess 48 in the bottom of the bushing. The upper end of the bushing may be provided with a recess 49 for a packing 50 and a gland 51 in screw threaded engagement with an internal thread at the upper end of the bushing. The bushing 17, when in place, forces the metering ring in intimate contact with the washer 26 and through it holds the valve seat 14 in place, the recess 48, receiving the flange 44 of the metering ring.

Referring now to the valve stem 18, it preferably comprises a major tubular section 53 and a minor tubular section 54. The section 53 is provided with a relatively coarse external screw thread 55 extending upwardly from its bottom, and is of a length less than the length of thread 47 in bushing 17 with which it has engagement, to cause the section 53 to rise when rotated, in a manner similar to an ordinary valve stem of a globe valve. The section 53 is also provided with a relatively fine internal screw thread 56 leading from its bottom, and internal and external screw threads 57 and 58, respectively, leading downwardly from the top of section 53. The minor tubular section 54 is provided with an external screw thread 59 leading from its top and along its upper portion, for cooperation with thread 56, and, in the example shown, is slotted at its top to provide polygonal wrench receiving faces 60 whereby it may be adjusted so that its extended portion 61 projects to various degrees from the lower end of major section 53. The lower end of minor section 54, forming part of the lower portion of this section 54, is arranged for engagement with the upper face of valve disc 15 and the stem 41 of the latter fits loosely in the hollow of minor section 54. By inserting the shank of a tool, not shown in the drawing, partly into the hollow of section 53, the bit of the tool, such as a wrench or screw driver, may be used to adjust the minor section 54 with respect to the major section 53 and thus the extent to which the valve disc 15 may be forced away from the seat 14 may be adjusted and the maximum flow through the valve regulated as previously described. The packing 50 may be brought into intimate contact with the external periphery of major section 53 above its thread 55 by gland 51 to prevent escape of fluid as is well understood.

The hub 20 of handle 19 is provided with a circular internal flange 63, an internal screw thread 64 below the flange for engagement with the external thread 58 of major section 53 and an internal screw thread 65 for cooperation with the thread of crowning button 22.

The plug 21 is externally screw threaded for cooperation with the internal thread 57 of major section 53, and is provided with an annular flange 66 above its threaded portion to engage upon the internal flange 63 of hub 20. Thus, upon removing button 22, the direction in which handle 19 extends with respect to the direction of flow of fluid through the valve, may be adjusted by relieving pressure of flange 66 on flange 63 and rotating the handle 19 and hub 20, and subsequently screwing the plug 21 tight. For instance, with the valve disc in a fully open position of seat 14, depending on adjustment of minor section 54 with respect to major section 53 of valve stem 18 and the thread 55 abutting against the metering ring 16, as shown in Fig. 2, the handle 19 may be disposed as shown in Fig. 1, projecting from its hub in the direction of flow of fluid through the valve.

The bonnet 24 comprises a tubular body portion 68 the lower portion of which is in threaded engagement with flange 34 of housing 12, and a top wall 69 provided with a perforation 70 through which the major section 53 of valve stem 18 extends.

Figure 10:
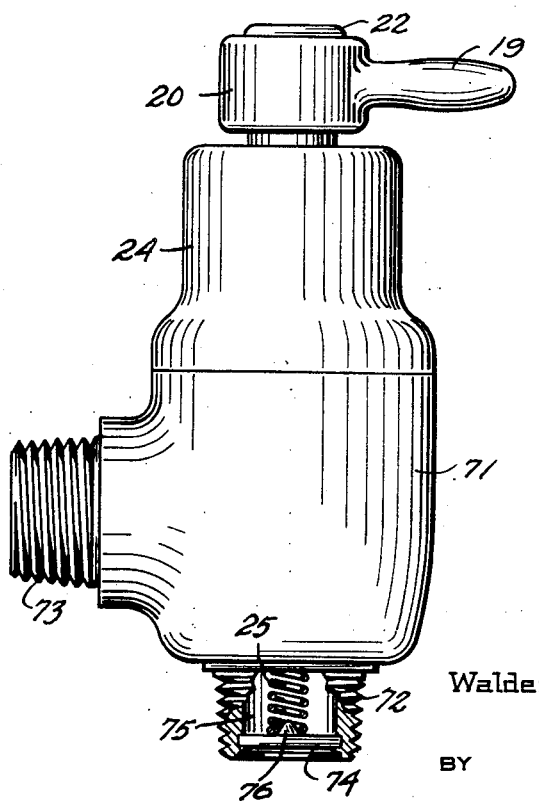
Fig. 10 is a view in side elevation of an angle valve, partly broken away to show how our invention may be applied to a valve where the axes of the ends of the body are in angular relation to one another.

The modified form of our invention shown in Fig. 10 is similar to that previously described, except that a valve body 71 is provided having inlet and outlet pipe ends 72 and 73, respectively, with their axes in right angular relationship, the inlet pipe end being at the bottom of the body 71. Thus the spring 25, if used, must abut against a bar or web 74 extending crosswise of the port 75, this bar or web being provided with a spring retaining boss 76 to support the spring at its lower portion.

It will be noted that the valve elements may be manufactured at a low cost and compactly assembled. Also, that two adjustments are possible to accomplish a principal object of the invention, that is, to control the maximum quantity of fluid that may be delivered through the valve during a given period of time, according to the pressure of the fluid in supply line. One of such adjustments is by the selection of an appropriate metering ring, which requires the removal and replacing of several of the elements of the valve, and the other, by adjusting the extent to which portion 61 of minor section 54 of the valve stem 18 projects from major section 53, when the thread 55 of the latter abuts the metering ring and which may be accomplished by removing button 22 and plug 21, using a tool as previously described and replacing these elements.

The metering ring 16 performs a dual function, that is, to present restricted flow ways in the valve open to the way 37 and outlet port 31, and to assist in firmly holding the valve seat 14 in place.

We claim:

In a valve of the character described, the combination of a housing provided with a fluid passage and an opening coaxial with said passage; a valve disc in said passage; an annular seat for said disc, detachably disposed in said passage; a metering ring holding said seat in said passage and disposed coaxial with said passage, in a plane parallel to the plane of said seat at the side of the latter adjacent to said housing opening, said ring provided with a plurality of radial ports open to its center and periphery to provide outlet ways for fluid flowing through said passage and the opening of the seat when the valve disc is in an open position; a bushing adjustable in said opening of the housing and engaging the outermost portion only of an end face of said metering ring opposite said seat, said bushing provided with an internal screw thread; and a valve stem comprising a major tubular section provided with an internal screw thread and an external screw thread said latter thread in operative engagement with the thread of said bushing for axial movement of the stem when said major portion is rotated and for engagement with the innermost portion of said end face when said stem is rotated in a predetermined direction, and a minor stem section provided with an externally screw threaded portion disposed in threaded engagement with the internal thread of said major section, and a portion extending from said externally screw threaded portion through said metering ring and seat and engaging said valve disc to unseat the same when the stem is rotated in a predetermined direction.

WALDEMAR CREVATIN.
GÍLIO CREVATIN.
MÁRIO CREVATIN.

REFERENCES CITED

The following references are of record in the file of this patent:

UNITED STATES PATENTS

| Number | Name | Date |
| --- | --- | --- |
| 1,494,543 | Hazeltine | May 20, 1924 |
| 1,694,234 | Schimmel | Dec. 4, 1928 |
| 2,159,452 | Samaras | May 23, 1939 |

FOREIGN PATENTS

| Number | Country | Date |
| --- | --- | --- |
| 285,853 | Great Britain | 1928 |